Aug. 24, 1965 H. M. ATCHESON 3,202,768

TELEPHONE DIRECTORY DEVICE

Filed Sept. 18, 1961

INVENTOR.
HOWARD M. ATCHESON
BY John R. Walker, III
Attorney

United States Patent Office 3,202,768

Patented Aug. 24, 1965

3,202,768

TELEPHONE DIRECTORY DEVICE

Howard M. Atcheson, 76 St. Albans Drive, Memphis, Tenn.

Filed Sept. 18, 1961, Ser. No. 138,665
6 Claims. (Cl. 179—100)

This invention relates to a device in a telephone which contains the information normally contained in a telephone book and means for selectively projecting at least one desired telephone number on a screen located in the telephone base.

With the advent of long distance direct dialing and with the increased amount of telephones in use, the telephone numbers have become increasingly longer and more difficult to remember so that many times the wrong number is dialed which usually necessitates again looking up the number in the phone book.

The present invention is directed towards overcoming the above mentioned and other problems by providing means for completely eliminating the telephone book, and by providing means for maintaining the selected number in view as long as necessary, for example, until the number has been dialed.

Thus, one of the objects of the present invention is to provide in a telephone a device including a film roll containing an index of telephone numbers and means for selectively projecting at least one desired number on a screen located in the telephone base.

A further object is to provide such a device including means for winding the film from one reel to the other so that means is provided for changing the viewed telephone number that is projected on the screen.

A further object is to provide such a device including means for scanning portions of the film so that different viewed portions of the film may be moved onto the screen with the movement being substantially at right angles relative to the movement caused by the winding of the film from one reel to another.

A further object is to provide such a device including means for causing the number to appear on the screen when the telephone receiver is lifted.

A further object is to provide such a device including means for facilitating dialing of the telephone in a dark room.

A further object is to provide a very handy, convenient and fast means for finding a desired telephone number.

A further object is to provide a unique telephone and index combination.

A further object is generally to improve the design and construction of telephone devices.

The means by which the foregoing and other objects of the present invention are accomplished and the manner of their accomplishment will be readily understood from the following specification upon reference to the accompanying drawings, in which.

Figure 1:
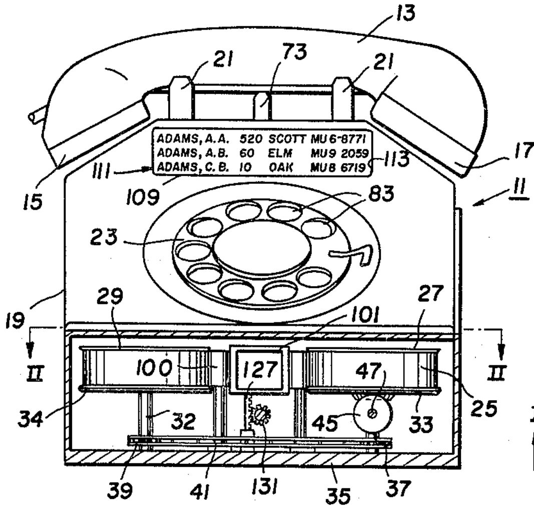
FIG. 1 is a sectional view of the device of the present invention taken as on the line I—I of FIG. 2.
Figure 2:
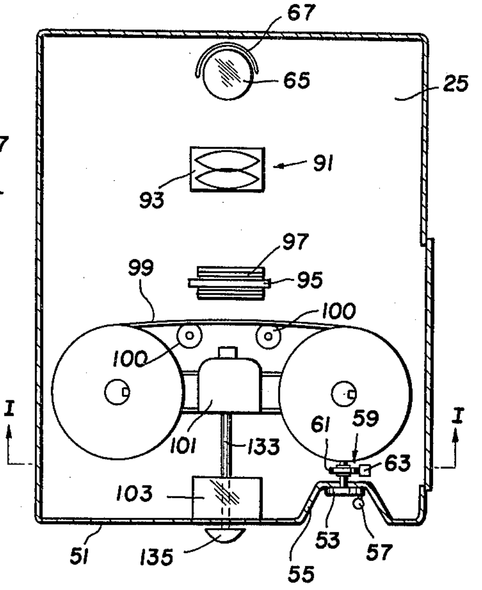
FIG. 2 is a sectional view taken as on the line II—II of FIG. 1.
Figure 3:
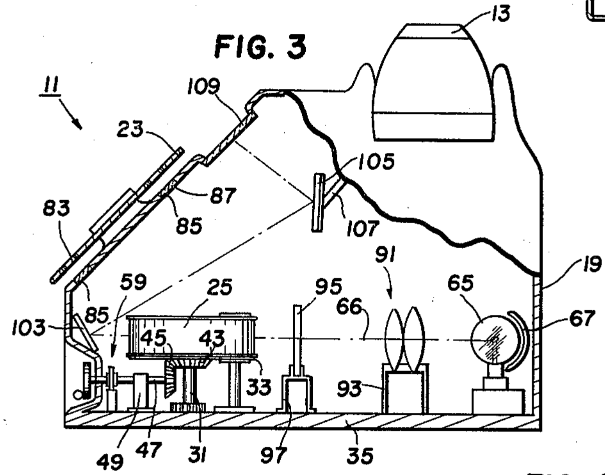
FIG. 3 is a side elevational view of the device of the present invention with portions being broken away for purposes of illustration.

Referring now to the drawings in which the various parts are indicated by numerals, the telephone device 11 of the present invention includes the usual hand set 13 having a mouth piece 15 and ear piece 17. A telephone base 19 is provided which is constructed in a similar manner to the usual telephone base except that it is somewhat larger and modified in a manner which will be understood better in the detailed description thereof to follow later in the specification. Telephone base 19 is provided with the usual projections 21 for holding hand set 13 when the telephone is not in use, as seen in FIGS. 1 and 3. In addition, telephone base 19 is provided with the usual dial 23 for dialing the telephone numbers. Other of the usual telephone mechanisms, such as the wiring, switches, etc., have been omitted in the drawings since they form no part of the present invention.

An elongated film 25, which is preferably of the microfilm type, is mounted upon a pair of spaced reels 27, 29 which in turn are respectively mounted on a pair of spindles 31, 32 for rotation therewith. Spindles 31, 32 are rotatably supported from the bottom 35 of base 19 and respectively include flanges 33, 34 upon which the reels actually rest. Spindles 31, 32 are preferably interconnected for concurrent rotation as by means of gears 37, 39 respectively fixedly attached to the spindles and receiving thereon a continuous chain 41. A miter gear 43 is fixedly mounted on spindle 31 and engaged by miter gear 45 which in turn is fixedly mounted on a shaft 47, that in turn is rotatably supported from bottom 35 by a bearing 49. Shaft 47 rotatably extends through the front 51 of telephone base 19 where a circular disc 53 is fixedly mounted on the end of the shaft 47 in a recess 55 provided in front 51. A knob 57 is pivotally mounted on disc 53 so that the knob can be grasped by a person to manipulate disc 53 in a rotary motion to turn shaft 57, which in turn rotates reels 27, 29 by the gears heretofore described and winds the film 25 from one reel to the other depending upon the direction of rotation of disc 53. A friction device generally indicated by the numeral 59 is provided for shaft 47 and arranged so that the momentum will not cause continued rotation of reels 27, 29 after knob 57 is released yet will permit shaft 47 to turn easily when desired. Friction device 59 preferably comprises a roller 61 formed of rubber or the like mounted on shaft 47 and frictionally engaging a projection 63 mounted on bottom 35.

Figure 4:
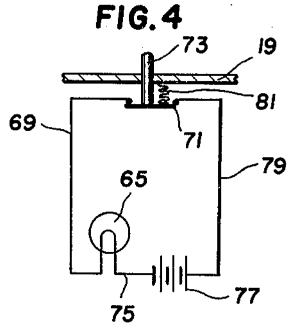
FIG. 4 is a somewhat schematic view showing the light system.

A source of light, as an electric lamp or light 65, is mounted on bottom 35 adjacent the rearward portion thereof and the light therefrom is directed forwardly as by means of a reflector 67 mounted behind the light bulb. These light rays are indicated diagrammatically as at 66. The electrical circuit of light 65 is preferably as shown in FIG. 4 wherein it will be seen one lead 69 leads from light 65 to a switch 71 which is normally held in an open position, when hand set 13 is not in use, by means of a pin 73 which contacts the switch adjacent the lower end thereof and is contacted by hand set 13 adjacent the upper end thereof. Another lead 75 extends from light 65 to a suitable source of electricity, as a wall socket or a battery 77, and a third lead 79 extends from the battery to switch 71 so that with switch 71 in the normal open position, as above described, the light 65 will not be illuminated. A spring 81 extends between switch 71 and base 19 and is arranged so that when hand set 13 is lifted for using the telephone, the spring will urge switch 71 into the closed position to turn on light 65 since the hand set is no longer holding pin 73 downward but the pin is released and moves upward to permit the switch to close.

Below the usual finger holes 83 provided in dial 23 are apertures 85 in the front 51 and in which apertures are respectively mounted transparent pieces 87 upon which are imprinted the usual numbers so that when light 65 is illuminated, the light shines through transparent pieces 87 and the numbers printed thereon can be seen, whereby a telephone number may be dialed even though the room is dark.

The light rays 66 shine through the lens group 91 which comprises any suitable group of lenses to concentrate the light and which is supported from bottom 35 by any means such as support 93. The light rays 66 shine through a heat absorbing glass 95 of any suitable well-known construction which is supported by suitable means as a bracket 97. Then, the light rays 66 shine through the portion 99 of the film which is between reels 27 and 29. It should be notd that this portion 99 of the film preferably rides against a pair of spaced friction rollers 100 respectively rotatably supported from bottom 35 for rotation about vertical axes. Next, the rays 66 shine through a suitable focusing lens or lenses of known construction which may be provided in a suitable housing, and the lens and housing are indicated somewhat diagrammatically as at 101. After traveling through lens 101 the rays 66 strike an angularly disposed mirror 103 which is mounted in base 19 and thence is reflected to another mirror 105 also mounted in base 19 by suitable means as a bracket 107. The light rays 66 are reflected from mirror 105 to the back-side of a transparent screen 109 so that an image as at 111 is established on the screen which can be viewed by the user of the telephone device, as best seen in FIG. 1. Screen 109 is preferably formed of Polaroid glass and is attached to front 51 to cover opening 113 provided through front 51.

Figure 5:
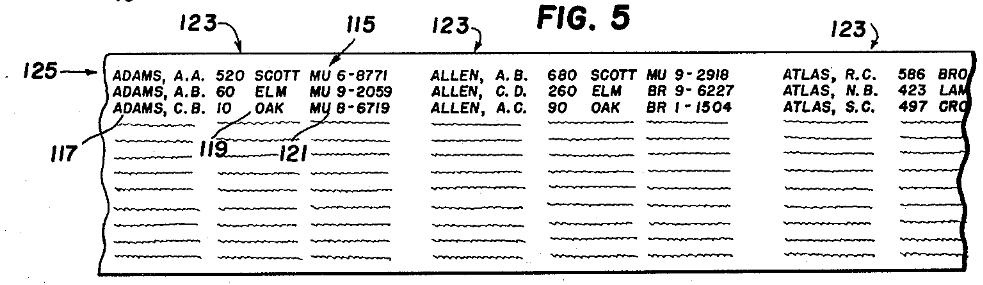
FIG. 5 is a fragmentary elevational view of a portion of the film tape of the present invention.
Figure 6:
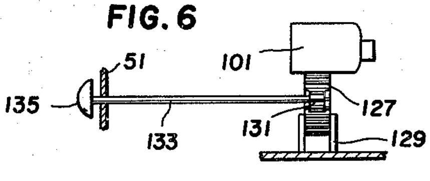
FIG. 6 is a fragmentary view showing the scanning means of the present invention.

All of the information normally contained in a telephone book is provided on film 25. The preferable arrangement of the names, addresses and telephone numbers is shown in FIG. 5 wherein it will be seen that each individual set of information 115, which consists of a name 117, a street and number 119, and telephone number 121, is arranged in side-by-side relationship as in a phone book, with the last names being in alphabetical order. The information 115 is preferably arranged in a plurality of vertical columns 123 with each of the columns containing a plurality of horizontal rows 125. It will be understood that by turn of disc 53 a selected one of columns 123 can be brought into view on screen 109, and at least one row 125 of information 115 is brought into view although the optical system may be arranged so that more than one row of information can be brought into view, as for example, three as shown in FIG. 1. It will be understood that the movement of the image 111 on screen 109 will be horizontal upon turn of the disc 53, in other words, to the right or left as viewed in FIG. 1.

Scanning means is preferably provided for moving the viewed portion of film 25 so that different rows 125 of the same column 123 can be moved into view on screen 109. In other words, this scanning movement is vertical and at substantially a right angle relative to the movement caused by turn of disc 53. This scanning means is preferably constructed as follows: The lens 101 is mounted for vertical movement so that the light from different portions of the film passes therethrough. Thus, lens 101 is fixedly mounted adjacent the top of a rack gear 127 which is slidably mounted for vertical movement in a bracket 129 attached to bottom 35. A pinion 131 engages rack 127 and is fixedly mounted on a rod 133 which in turn is rotatably mounted in telephone base 19 and extends through an aperture in front 51 where a knob 135 is fixedly attached. It will be understood that turn of knob 135 in one direction will raise lens 101 and turn of the knob in the opposite direction will lower the lens so that the projected image on screen 109 will be scanned vertically. It will be understood that although one particular arrangement of the information 115 contained on film 25 has been described, other arrangements may be used without departing from the spirit and scope of the present invention.

From the foregoing description it will be understood that a very convenient and handy device is provided which can quickly and easily locate telephone numbers, even in a darkened room, and once the number has been located it will remain in a fixed position in front of the person until he has completed the call, so that there is no chance of forgetting the number or having to look it up again. In addition, it will be understood that the nuber can be dialed in the darkened room. Furthermore, it will be understood that unique means is provided for completely eliminating the necessity of a telephone directory.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a communication telephone set including a base, a pair of reels rotatably mounted in said base, an elongated film mounted on said reels, said film being provided with information including a plurality of individual telephone numbers and names, said base being provided with an opening therein, a transparent screen mounted on said base across said opening; optical means in said base including a light source, lens and mirrors for transmitting light rays through said film and onto said screen to establish an image on said screen of at least one telephone number and name; means operably coupled to said reels for the rotation thereof to position at least one selected telephone number and name on said screen.

2. In a communication telephone set including a base, a pair of reels rotatably mounted in said base, an elongated film mounted on said reels, said film being provided with information including a plurality of individual telephone numbers and names, said base being provided with an opening therein, a transparent screen mounted on said base across said opening; optical means in said base including a light source, lens and mirrors for transmitting light rays through said film and onto said screen to establish an image on said screen of at least one telephone number and name; means operably coupled to said reels for the rotation thereof to position at least one selected telephone number and name on said screen, and means coupled to said optical means for moving different viewed portions of said film onto said screen with the movement being substantially at right angles relative to the movement caused by the rotation of said reels.

3. In a communication telephone set including a base, a pair of spaced reels rotatably mounted in said base, an elongated microfilm mounted on said reels, said film being provided with information including a plurality of individual telephone numbers and names arranged in a plurality of columns each containing a plurality of rows, said base being provided with an opening therein, a transparent screen mounted on said base across said opening, a light source means in said base, lens means in said base for shining the light rays from said light source means through said film, means in said base for reflecting the light rays from said film to said screen, focusing lens means in the path of the light rays between said film and said screen for focusing the light rays on said screen, means operably coupled to said reels for the rotation thereof to project different columns of the information on the film onto said screen, and means attached to said focusing lens means for movement thereof to project different rows of the information on the film onto said screen.

4. In a communication telephone set including a base, a hand set removably carried by said base, and a dial rotatably carried by said base and having finger holes therein; said base being provided with apertures therein below said finger holes, transparent pieces respectively mounted in said apertures and having numbers printed thereon, a pair of spaced reels rotatably mounted in said base, an elongated microfilm mounted on said reels, said film being provided with information including a plurality of individual telephone numbers and names arranged in a plurality of columns, said base being provided with an opening therein, a transparent screen mounted on said base across said opening, means in said base including a light source and means responsive to removal of said hand set from said base for causing said light source means to illuminate said numbers, lens means in said base for shining the light rays from said light source means through said film, means in said base for reflecting the light rays from said film to said screen, focusing lens means in the path of the light rays between said film and said screen for focusing the light rays on said screen, and means operably coupled to said reels for the rotation thereof to project different columns of the information on the film onto said screen.

5. In a communication telephone set including a base, a hand set removably carried by said base, and a dial rotatably carried by said base and having finger holes therein; said base being provided with apertures therein below said finger holes, transparent pieces respectively mounted in said apertures and having numbers printed thereon, a pair of spaced reels rotatably mounted in said base, an elongated microfilm mounted on said reels, said film being provided with information including a plurality of individual telephone numbers and names arranged in a plurality of columns each containing a plurality of rows, said base being provided with an opening therein, a transparent screen mounted on said base across said opening, means in said base including a light source and means responsive to removal of said hand set from said base for causing said light source means to illuminate said numbers, lens means in said base for shining the light rays from said light source means through said film, means in said base for reflecting the light rays from said film to said screen, focusing lens means in the path of the light rays between said film and said screen for focusing the light rays on said screen, means operably coupled to said reels for the rotation thereof to project different columns of the information on the film onto said screen, and means attached to said focusing lens means for movement thereof to project different rows of the information on the film onto said screen.

6. In a communication telephone set including a base, a pair of reels rotatably mounted in said base, an elongated microfilm mounted on said reels, said film being provided with information normally found in a telephone book including a plurality of individual telephone numbers and names, said base being provided with an opening therein, a transparent screen mounted on said base across said opening; optical means in said base for transmitting light rays through said film and onto said screen to establish an image on said screen of at least one telephone number and name; independent means operably coupled to said reels for the rotation thereof to position at least a selected one of said telephone numbers and names on said screen.

References Cited by the Examiner

UNITED STATES PATENTS

| | | | |
|---|---|---|---|
| 1,988,162 | 1/35 | Chapman | 179—100 |
| 2,110,381 | 3/38 | Lohr | 88—24 |
| 2,388,313 | 11/45 | Dowey | 179—90 |
| 2,512,828 | 6/50 | Collins | 179—1 |

ROBERT H. ROSE, *Primary Examiner.*

THOMAS B. HABECKER, *Examiner.*